US008826706B2

(12) United States Patent
Buholzer et al.

(10) Patent No.: US 8,826,706 B2
(45) Date of Patent: Sep. 9, 2014

(54) BARREL LOCK

(75) Inventors: Ronald A. Buholzer, Monroe, WI (US); Steve J. Buholzer, Monroe, WI (US)

(73) Assignee: Klondike Cheese Co., Monroe, WI (US)

( * ) Notice: Subject to any disclaimer, the term of this patent is extended or adjusted under 35 U.S.C. 154(b) by 0 days.

(21) Appl. No.: 13/596,300

(22) Filed: Aug. 28, 2012

(65) Prior Publication Data

US 2014/0060124 A1 Mar. 6, 2014

(51) Int. Cl.
*F16K 35/00* (2006.01)
*G05G 5/00* (2006.01)
*E05B 65/00* (2006.01)

(52) U.S. Cl.
CPC .................................... *E05B 65/00* (2013.01)
USPC .................... 70/180; 70/164; 70/178; 70/232

(58) Field of Classification Search
USPC ........... 70/158, 163, 164, 174–178, 180, 229, 70/232
See application file for complete search history.

(56) References Cited

U.S. PATENT DOCUMENTS

| | | | | | |
|---|---|---|---|---|---|
| 1,484,793 | A | * | 2/1924 | Moore | 70/178 |
| 1,780,994 | A | * | 11/1930 | Caldwell | 70/180 |
| 1,829,444 | A | * | 10/1931 | Goebel et al. | 70/284 |
| 4,538,434 | A | * | 9/1985 | Janzen et al. | 70/178 |
| 5,033,280 | A | * | 7/1991 | Johnson | 70/232 |
| 5,193,366 | A | * | 3/1993 | Brinkman | 70/18 |
| 5,412,962 | A | * | 5/1995 | Thompson | 70/178 |
| 5,806,555 | A | * | 9/1998 | Magno, Jr. | 137/385 |
| 5,927,111 | A | * | 7/1999 | Nachbauer | 70/161 |
| 5,941,103 | A | * | 8/1999 | Stearns | 70/178 |

* cited by examiner

*Primary Examiner* — Christopher Boswell
(74) *Attorney, Agent, or Firm* — Ryan Kromholz & Manion, S.C.

(57) ABSTRACT

Provided is a barrel lock that can be used to securely lock a barrel opening, and in particular, a barrel pump positioned in a barrel opening. The barrel lock has a lock body, a closure mechanism, a locking mechanism, and is secured by a locking means. The lock body is capable of assuming an open position and a closed position for locking about the barrel pump. In a closed position, the locking mechanism is used to secure the lock body in a closed position and to secure the closure mechanism in engagement with the lock body, to thereby secure the barrel pump from use.

20 Claims, 3 Drawing Sheets

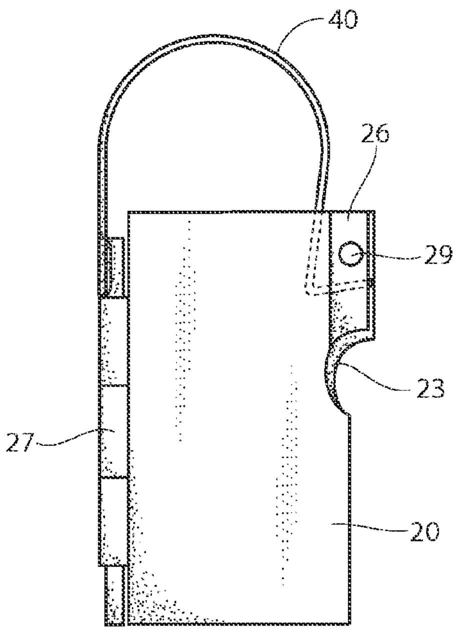
Fig. 6
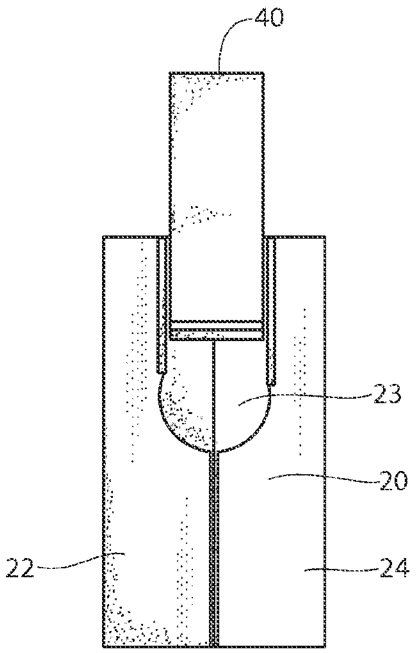
Fig. 7
Fig. 8
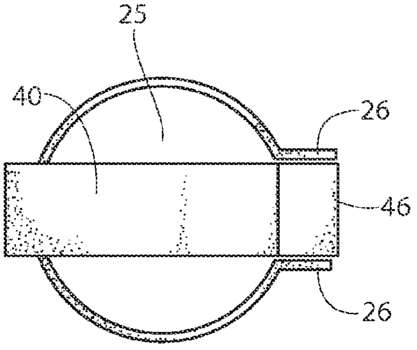
Fig. 9
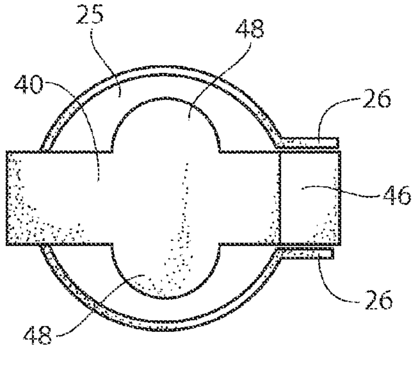

BARREL LOCK

BACKGROUND OF THE INVENTION

This invention relates generally to the storage of chemical or otherwise hazardous materials in drums or barrels, and more specifically to a lock mechanism for locking a barrel, or the pump of a barrel, containing hazardous materials.

Strict regulations apply to the handling, storing, and use of chemicals and other hazardous materials, such as cleaning materials, especially in areas where food processing takes place. The Global Food Safety Initiative (GFSI) instituted strict regulations regarding the presence and storage of cleaning materials, and other hazardous materials, during food processing. Current practice requires that during food processing, barrels and drums containing hazardous materials must be locked up. This may require that the barrels be physically moved between a secured and locked area during food processing to an area that is easily accessible during cleaning. This transportation is not convenient nor efficient given the potential size and weight of the barrels filled with cleaning materials.

As such, there is a need for a locking mechanism that can be utilized on a chemical barrel so as to abide by the safety regulations, while also allowing the barrel to remain in an area during food processing, and also allowing for the pump apparatus to remain within the barrel bung, thereby providing easy and quick access to the material when cleaning is commenced.

SUMMARY OF THE INVENTION

The present invention provides a device for locking a barrel and/or barrel pump.

In one aspect of the invention, the barrel lock includes a substantially tubular lock body sized and configured for placement about a barrel opening, a bung stopper, or a pump apparatus positioned in said barrel opening. The tubular lock body may be capable of assuming at least an open position and a closed position, wherein in the closed position, the tubular lock body extends about a lock body axis and forms a lock body opening. The barrel lock also includes a closure mechanism sized and configured to engage with the lock body, wherein when the closure mechanism is engaged with the lock body, the closure mechanism at least partially covers the lock body opening. The barrel locks also includes a locking mechanism on the lock body configured to retain the lock body in the closed position and to retain the closure mechanism in engagement with the lock body.

The tubular lock body may have at least two lock body segments wherein a first segment is rotatably coupled to a second segment, wherein each segment is rotatable about a hinge axis.

The tubular lock body may have two lock body segments rotatably coupled at a hinge portion, and rotatable about a common hinge axis.

The closure mechanism may have an engagement member to engage with the lock body, a hooked portion having a distal end, and a ledge at the distal end.

The closure mechanism may have an elongated engagement member to engage with the lock body, a hooked portion having a distal end, and a ledge at the distal end, and the engagement member may be configured to engage with the hinge.

The hooked portion of the engagement member may be substantially flat.

The locking mechanism may have a pair of separated flanges extending from the lock body, radially from the lock body axis. Each flange may comprise an aperture for receiving a locking means.

The locking means may be a padlock.

The barrel lock may be configured such that when the closure mechanism is engaged with the lock body, the ledge is positioned between the flanges below and in at least partial vertical alignment with the apertures.

The lock body may also have a cutaway section for receiving a pump spout therethrough.

The invention also includes a method for using and securing the device to lock the pump or barrel opening.

BRIEF DESCRIPTION OF THE DRAWINGS

FIG. 6 is a side elevation view of a barrel lock according to the present invention.

FIG. 7 is a front elevation view of a barrel lock according to the present invention.

FIG. 8 is a top view of a barrel lock according to the present invention.

FIG. 9 is a top view of an alternative embodiment of a barrel lock according to the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
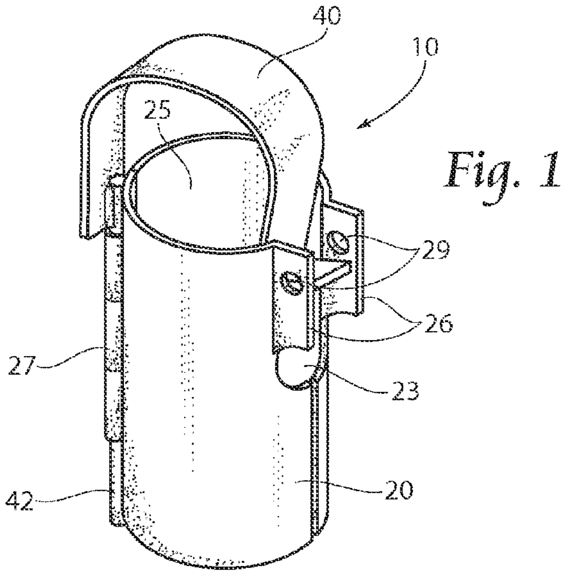
FIG. 1 is a perspective view of an embodiment of a barrel lock according to the present invention.
Figure 2A:
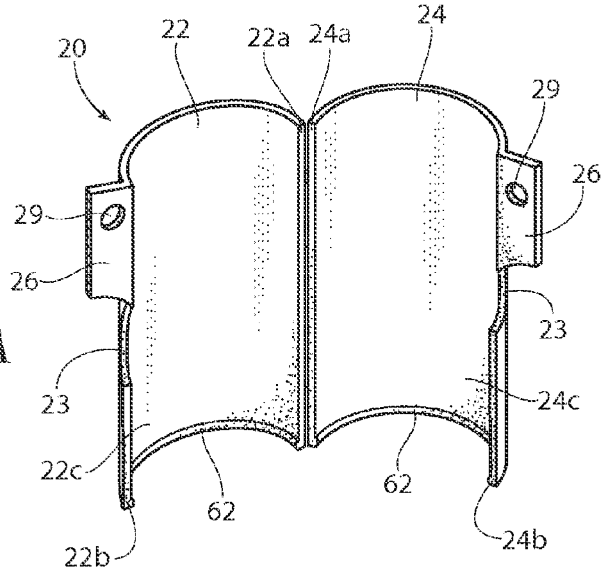
FIG. 2A is a perspective view of an embodiment of a lock body according to the present invention in an open position.
Figure 2B:
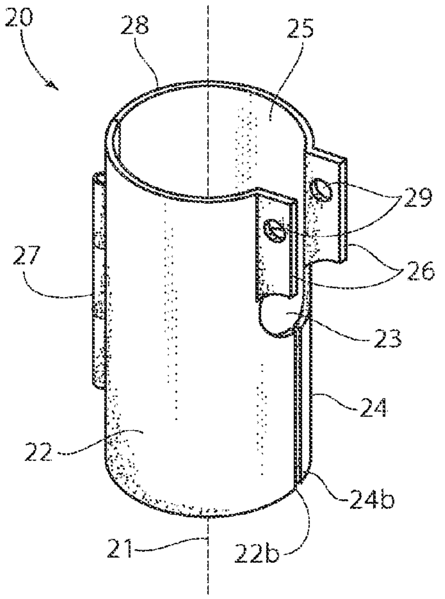
FIG. 2B is a perspective view of a lock body of a barrel lock according to the present invention in a closed position.

FIG. 1 shows one embodiment of a pump lock 10 according to the present invention. The pump lock 10 comprises a lock body 20 and a closure mechanism 40. In a preferred embodiment, the lock body 20 comprises a longitudinal, substantially tubular body configured to be positioned around a barrel pump 82 or around a barrel opening 88 typically receiving a bung stopper. The lock body 20 may be constructed to be any height that is capable of positioning over a pump 82 or any other plug or device that is positioned in or at the barrel opening 88. As shown in FIGS. 2A and 2B, the lock body 20 may comprise at least two segments 22, 24 that are coupled in a rotatable relationship to each other or to another portion of the lock body 20, such as by a hinge mechanism 27 or a plurality of longitudinally aligned hinge mechanisms. The hinged attachment allows for the body segments 22, 24 to take on at least two positions as the segments 22, 24 rotate about a hinge axis, a first open position, shown in FIG. 2A, and a second closed position, shown in FIG. 2B. In the closed positioned, the lock body 20 extends longitudinally about a lock axis 21. The lock body 20 may be positioned at or near the barrel pump 82 or barrel opening 88 in the open position and then positioned around the pump 82 or barrel opening 88 in the second closed position.

Figure 3:
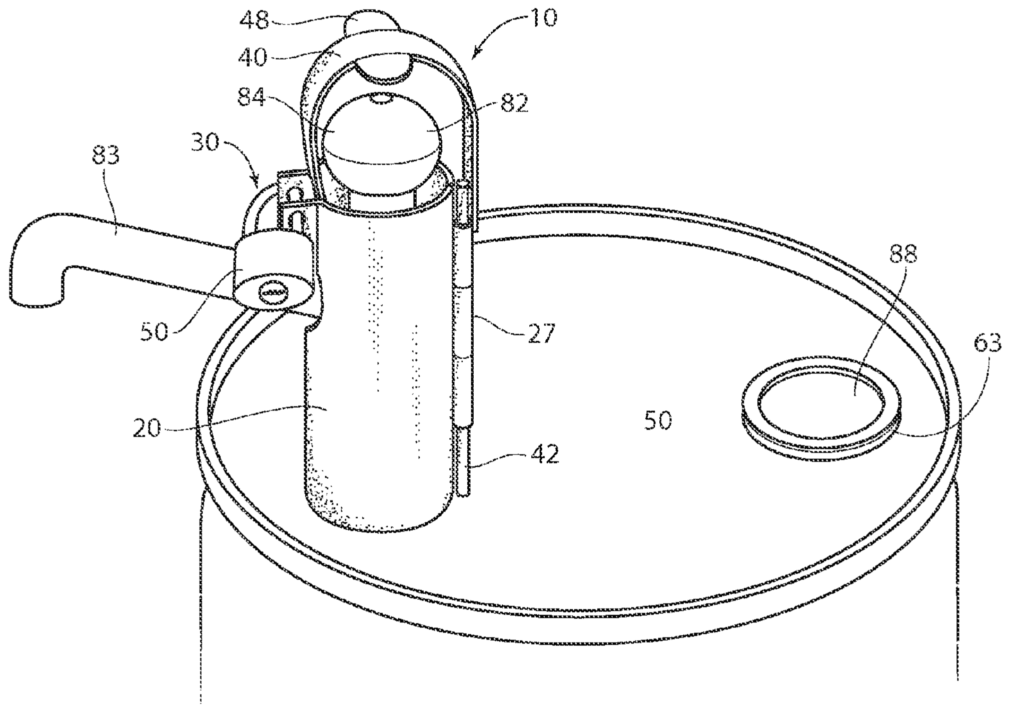
FIG. 3 is a perspective view of a barrel lock according to the present invention in use over a barrel pump.

The segments 22, 24 each have a connecting edge 22*a*, 24*a* and a distal edge 22*b*, 24*b*. In the closed position, the distal edges 22*b*, 24*b* come together to at least substantially enclose the lock body 20 about the lock axis 21. There may be a cutaway portion 23 formed in one or both of the distal edges 22*b*, 24*b* to allow for passage of a pump spout 83 therethrough when the body 20 is in a closed position, as shown in FIG. 3. In the closed position, the distal edge 22*b* of a first segment 22 may be closely adjacent the distal edge 24*b* of a second segment 24, or the distal edges 22*b*, 24*b* may be spaced apart at a distance that is less than the diameter of the pump spout 83.

Each of the segments 22, 24 may have an engagement ledge 62 on the inner face 22*c*, 24*c* at the bottom end 38 of the lock body. The engagement ledge 62 accommodates securing the pump lock 10 over the pump 82 and/or the barrel opening 88 by reaching below a ridge 63 in the perimeter of the barrel opening 88 and prohibiting the upwards movement and removal of the lock 10 from the barrel opening 88 when the pump lock 10 is in a closed position and locked. This secures the pump lock 10 over the opening 88 even when there is no pump 82 present.

FIG. 3 also shows the lock body may further comprise a locking apparatus 30. The lock apparatus 30 provides a mechanism for locking the lock body 20 in the closed position and maintaining the lock body 20 over the pump 82 or opening 88. In a preferred embodiment, the locking apparatus 30 comprises a flange 26 extending from each of the segments 22, 24, generally radially out from the lock body axis 21, at at least a portion of the distal edge 22*b*, 24*b*. Preferably, the flange 26 is positioned along the distal edge 22*b*, 24*b* in a location substantially towards a top edge 28 of the lock body 20. The flange 26 may originate flush with the top edge 28, as shown, or may originate at a location below the top edge 28. The locking apparatus 30 may be further configured to accommodate a locking means 50. In a preferred embodiment, each flange 26 comprises an aperture 29, preferably, but not necessarily, with the flange aperture 29 on a first segment 22 being substantially aligned with the aperture 29 on the second segment 24. The aperture 29 is configured to receive a locking mechanism 50, such as the hook of a padlock as shown. Other locking apparatus 30 may be used to secure the lock body 20 in a closed position, over the pump 82 or barrel opening 88.

Figure 4:
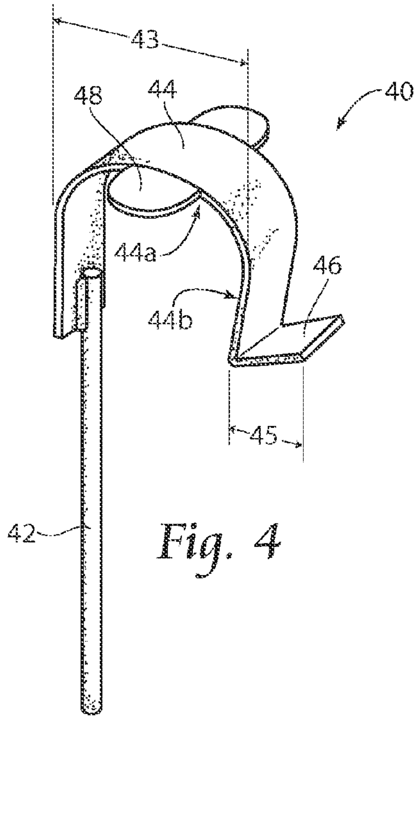
FIG. 4 is a perspective view of an embodiment of an embodiment of a closure mechanism according to the present invention.
Figure 5:
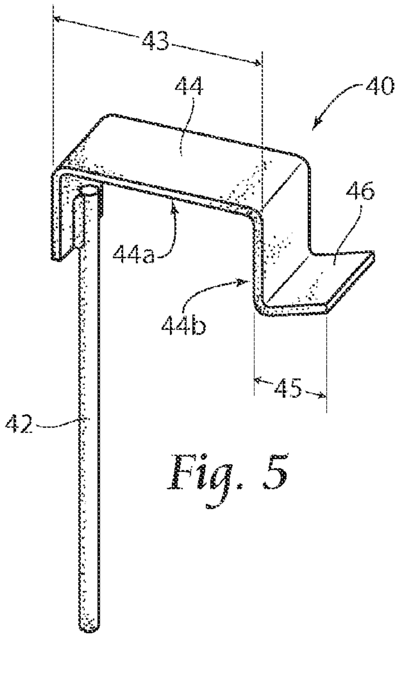
FIG. 5 is a perspective view of a second embodiment of a closure mechanism according to the present invention.

The flanges 26 are generally spaced apart when the lock body 20 is in the closed position to accommodate the passage and the positioning of the closure mechanism 40 at least partially between the two flanges 26. FIGS. 4 and 5 show a closure mechanism 40 that comprises a longitudinal engagement member 42, a hooked portion 44, and a ledge 46. The closure mechanism 40 is configured to accommodate engagement with the lock body 20, such as by engagement member 42. In the embodiment shown, the engagement member 42 engages with the hinge mechanism 27, by passing through cylinders or loops on the connecting edge 22*a*, 24*a* of the segments 22, 24, and thereby creating the hinge 27.

The hooked portion 44 is configured to extend substantially perpendicular to the engagement member 42 for a portion 44*a* thereof to extend over the upper opening 25 of the pump body 20 when in the second closed position, as shown in FIGS. 1 and 3. At least a second portion 44*b* of the hooked portion 44 extends substantially parallel to the engagement member, in the direction of the lock body 20. The first, perpendicular portion of hooked portion 44, as shown in FIG. 3, may prevent the manipulation of the pump 82 and therefore prevent use of the pump 82 while locked. To further accommodate the prevention of pump manipulation, the hooked portion 44 may have an obstruction panel 48 formed on the first portion 44*a*, as shown in FIGS. 3, 4, and 9. The obstruction panel 48 widens at least a portion of the first portion 44*a* to thereby prohibit accessing and manipulating the pump via the areas to the side of the hooked portion 44 of the closure mechanism 40.

The second, parallel portion further comprises the ledge 46 at the distal end, which is configured to assist in the locking of the pump lock 10 and interact with the locking apparatus 30, such as the flanges 26 and locking mechanism 50 of a preferred embodiment. When the latching mechanism 40 is engaged with the lock body 20, the ledge 46 extends outwardly to be positioned at least partially between the flanges 26. In the preferred embodiment, the second, parallel portion extends downward at a necessary length such that the ledge 46 is positioned below the apertures 29 in the flanges 26. Furthermore, the ledge 46 and apertures 29 preferably at least partially overlap in longitudinal alignment, such that when a locking mechanism 50, such as a padlock, is passed through the apertures 29, longitudinal, upwards movement of the latching mechanism 40 is prevented by way of the ledge 46 being restricted by the locking mechanism 50. This longitudinal overlap can be accomplished by selecting a specific diameter 43 of the hook portion 42, or by selecting a specific length 45 of the ledge 44, or both in combination. This, therefore, locks the lock body 20 in the second, closed position, and also locks the latching mechanism 40 in engagement with the lock body 20. This accommodates the locking of the pump lock 10 over the pump or bung hole, because upwards removal of the entire lock 10 is prevented by the pump spout 83 extending through the lock body 20 that is locked in the second, closed position and therefore cannot be opened and removed. The lock also prevents manipulation of the pump 82, by way of the latching mechanism 40, by preventing access to the pump 40 by locking the latching mechanism 40 in engagement with the lock body 20 over the lock body opening 25.

The hooked portion 44 may be substantially semi-circular in shape, as shown in FIG. 4, or substantially flat, as shown in FIG. 5. The semi-circular hook portion 44 can accommodate a pump 82 having an upwardly extending ball handle 84. The height 49 of the hooked portion is great enough to fit over the top of the pump 82, but not too great to allow upwards manipulation of the pump 82 or easy access to the pump 82 from above. The embodiment having the substantially flat hooked portion 44 may be used on a suction wand for a remote pump, or when the lock 10 is being used on a barrel that is unused, or otherwise does not have a pump 82 inserted into the barrel opening 88, or in any situation when the semi-circular hook may not be necessary to provide space for the particular pump being used.

The barrel lock 10 may be constructed of any strong material for which breakage would not be a concern, such as stainless steel. Alternatively, other materials that may present advantages in certain aspects may be used, such as injection molded plastic which may be a more cost-effective material.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A barrel lock comprising:

a substantially tubular lock body having an open top end and an open bottom end, said bottom end being sized and configured for placement about at least one of the following: a barrel opening, a bung stopper, and a pump apparatus positioned in said barrel opening;

said tubular lock body capable of assuming at least an open position and a closed position, wherein in said closed position, said tubular lock body extends about a lock body axis and forms a lock body opening extending through said open top end and said open bottom end;

a closure mechanism sized and configured to be removably engaged with said lock body, wherein when said closure mechanism is engaged with said lock body, said closure mechanism at least partially covers said top end and said lock body opening;

a locking mechanism on said lock body configured to retain said lock body in said closed position and to retain said closure mechanism in engagement with said lock body.

2. The barrel lock of claim 1 wherein said tubular lock body further comprises at least two lock body segments defining said open bottom end, and an inward engagement ledge extending at least substantially around said open bottom end and configured to accommodate securing said lock body to a ridge surrounding an opening in a barrel, wherein a first segment is rotatably coupled to a second segment, wherein each segment is rotatable about a hinge axis.

3. The barrel lock of claim 2 having two lock body segments rotatably coupled at a hinge portion, and rotatable about a common hinge axis.

4. The barrel lock of claim 3 wherein said closure mechanism comprises an elongated engagement member to engage with said lock body, a hooked portion having a distal end, and a ledge at said distal end, and wherein said engagement member is configured to engage with said hinge.

5. The barrel lock of claim 1 wherein said closure mechanism comprises an engagement member to engage with said lock body, a hooked portion having a distal end, and a ledge at said distal end.

6. The barrel lock of claim 5 wherein said hooked portion of said closure mechanism further comprises an obstruction panel to widen at least a portion of said hooked portion.

7. The barrel lock of claim 5 wherein at least a portion of said hooked portion is substantially flat.

8. The barrel lock of claim 5 wherein said locking mechanism comprises a pair of separated flanges extending from said lock body, radially from said lock body axis, each flange further comprising an aperture for receiving a locking means.

9. The barrel lock of claim 8 wherein said locking means is a padlock.

10. The barrel lock of claim 8 wherein when said closure mechanism is engaged with said lock body, said ledge is positioned between said flanges below and in at least partial vertical alignment with said apertures.

11. The barrel lock of claim 1 wherein said lock body further comprises a cutaway section for receiving a pump spout therethrough.

12. A method of using a barrel lock comprising the steps of:

providing a barrel lock, said barrel lock comprising:

a substantially tubular lock body having an open top end and an open bottom end;

said tubular lock body capable of assuming at least an open position and a closed position, wherein in said closed position, said tubular lock body extends about a lock body axis and forms a lock body opening extending through said open top end and said open bottom end;

a closure mechanism sized and configured to be removably engaged with said lock body;

a locking mechanism on said lock body;

positioning said lock body open bottom end over at least one of the following barrel features: a barrel opening, a bung stopper, and a pump apparatus positioned in said barrel opening;

engaging said closure mechanism with said lock body;

arranging said lock body into said closed position to substantially surround said barrel feature; and using said locking mechanism to lock said lock body in said closed position and to retain said closure mechanism in engagement with said lock body;

wherein in said closed position, when said closure mechanism is engaged with said lock body, said closure mechanism at least partially covers said lock body opening.

13. The method of claim 12 wherein said tubular lock body comprises at least two lock body segments wherein a first segment is rotatably coupled to a second segment, wherein each segment is rotatable about a hinge axis.

14. The method of claim 13 wherein said closure mechanism comprises an elongated engagement member to engage with said lock body, a hooked portion having a distal end, and a ledge at said distal end, and further comprising the step of engaging said engagement member with said hinge.

15. The method of claim 14 further comprising engaging said locking means with said aperture on each of said flange, and locking said locking means.

16. The method of claim 12 wherein said tubular lock body comprises two lock body segments rotatably coupled at a hinge portion, and rotatable about a common hinge axis.

17. The method of claim 16 wherein said locking mechanism comprises a pair of separated flanges extending from said lock body, radially from said lock body axis, each flange further comprising an aperture for receiving a locking means.

18. The method of claim 17 further comprising positioning said ledge between said flanges below and in at least partial vertical alignment with said apertures.

19. The method of claim 12 wherein said closure mechanism comprises an engagement member to engage with said lock body, a hooked portion having a distal end, and a ledge at said distal end.

20. The method of claim 12 wherein said lock body further comprises a cutaway section for receiving a pump spout therethrough.

* * * * *